Nov. 19, 1963     F. VOLLHARDT     3,111,581
WATER LEVEL GAUGE COMPRISING RADIOACTIVE SOURCE AND DETECTOR
Filed Nov. 27, 1959
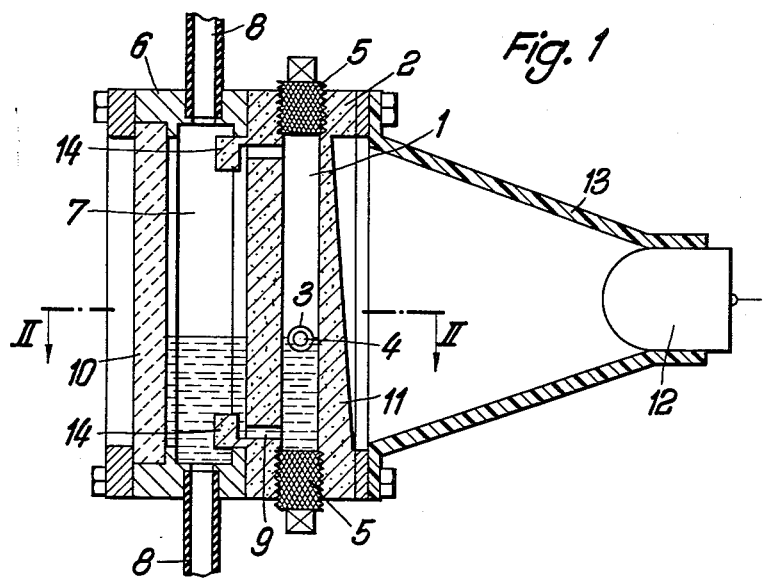
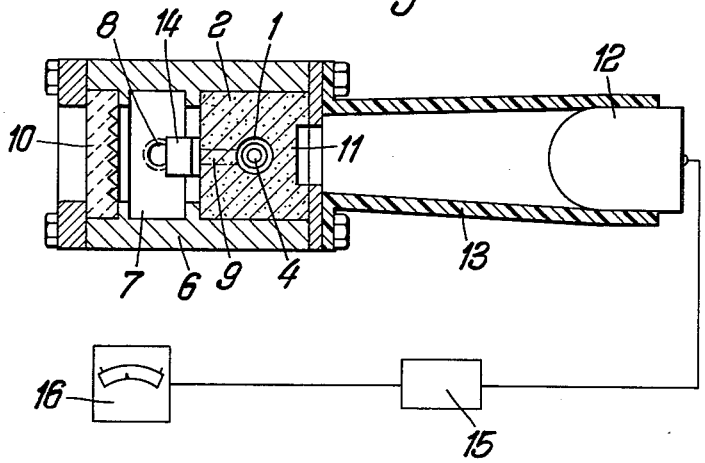
Inventor:
Fromut Vollhardt

United States Patent Office 3,111,581
Patented Nov. 19, 1963

3,111,581
WATER LEVEL GAUGE COMPRISING RADIO-
ACTIVE SOURCE AND DETECTOR
Fromut Vollhardt, Gottingen, Germany, assignor to
Schmidt'sche Heissdampf-Gesellschaft, mit beschrank-
ter Haftung, Kassel-Wilhelmshohe, Germany
Filed Nov. 27, 1959, Ser. No. 855,596
Claims priority, application Germany Dec. 23, 1958
2 Claims. (Cl. 250—43.5)

This invention relates to a water level gauge and, in particular, is directed to an apparatus for indicating the water level in steam boilers.

The object of the invention is to produce a water level gauge which cannot only be observed visually, but by means of which the water level in a boiler can be observed at a remote distance from the boiler.

In general, these objects are obtained by mounting a radioactive body so that it follows the water level in the boiler and varying the intensity of the emission passing between the body and the sensing device according to the height of the water in the boiler. The signals produced by the sensing device are amplified while being simultaneously compensated for the decay in the life of the emitting body and then transferred to an indicator or recorder at any suitable place.

The apparatus is composed of a tubular housing impermeable to radiation, as being composed of lead, for example, and sealed at both ends. One vertical wall of this body is composed of a wedge-shaped diaphragm whose thickness decreases from the bottom to the top and which forms a window for the passage of radiation emitted from the radioactive body. The radioactive body enclosed within a float is freely movable on the surface of the liquid, the body being communicatively connected with the water tank of the boiler. A sensing tube, such as a Geiger counter, is mounted on the opposite side of the wedge-shaped diaphragm wall for receiving the emissions from the body. The signals from the sensing device are passed through a conventional amplifier and then onto an appropriately calibrated indicator. The radiating body enclosed in the float and freely movable within the tubular housing moves up and down while floating with the water level of the boiler and adjacent the wedge-shaped diaphragm. The radiation received by the sensing device is dependent upon the thickness of the wall of the wedge-shaped diaphragm at the point at which the radiating body is located; and accordingly, the intensity of radiation received by the sensing device changes from a minimum to a maximum value so that the calibrated indicator gives an accurate reading of the existing boiler water level. The decrease in the intensity of radiation from the body which occurs because of the decay of the radiating body over a period of time is simultaneously compensated for by a corresponding voltage increase in the amplifier connected to the sensing device.

Advantageously, the tubular housing containing the radiating body is combined with a conventional optical water level gauge in such a way that the water in the visual gauge is in communication with the water in the tubular body containing the radiating body. Therefore, when the gauge is mounted in a boiler, the fireman can directly and visually read the optical water gauge; and, in addition, the water level gauge can be simultaneously read at a plurality of remote positions connected to the sensing device. Furthermore, the sensing device can be used to control the operation of the feed water pumps in order to regulate the water level in the boiler or an alarm device.

The means by which the objects of the invention are obtained are described more fully with reference to the accompanying drawings, in which:

FIGURE 1 is a vertical cross-sectional view through the indicating apparatus; and FIGURE 2 is a cross-sectional view taken on the line II—II of FIGURE 1.

The inner hollow space 1 of a tubular housing 2 composed of a radiation shielding material, such as lead, contains a float 3 within which is embedded a radioactive body 4. Lead plugs 5 seal the opposite ends of housing 2. This housing 2 is inserted in the casing 6 of a visually observable water gauge. The interior water containing space 7 of casing 6 is connected by pipes 8 with the steam water drum of a boiler. Upper and lower ports 9 in the wall of body 2 provide communication between spaces 7 and 1. Casing 6 has one wall formed of an inspection glass 10.

Housing 2 has one wall 11 formed as a wedge-shaped diaphragm with its wall thickness decreasing from bottom to top and forming a radiation window for the passage of radiation from the radioactive body 4. A sensing tube 12 is held in the apex of a cone 13 composed of a material impervious to the passage of radiation from body 4 and serving to shield the surrounding atmosphere from the radiations from body 4. For similar shielding reasons, baffles 14 are mounted across the openings of ports 9 into casing 6.

The radiations received by sensing device 12 are passed to an amplifier 15 and from there into an indicator 16 placed at any desired position. The amplifier can have its voltage adjusted so as to compensate for the decay in the intensity of radiation from body 4 over a period of time.

In operation, the intensity of radiation received by sensing device 12, such as a Geiger counter, depends upon how much radiation is shielded from sensing device 12 by the thickness of diaphragm 11. When the boiler water level is low, relatively weak signals will be received by sensing device 12 and a low water level registered on the indicating device 16. As the water level rises in the boiler, the thickness of diaphragm 11 with respect to the position of body 4 becomes less and a correspondingly stronger radiation is received by sensing device 12, with a correspondingly higher water level observed in indicator 16.

Having now described the means by which the objects of the invention are obtained, I claim:

1. A water level indicating gauge for a steam boiler comprising the combination of a casing having one wall composed of transparent material for the visual inspection of the gauge, a tubular housing composed of radiation shielding material joined to said casing and forming a second wall of said casing, said housing being adapted to contain a floating radioactive body and having a wedge shaped outer radiation window wall decreasing in thickness from bottom to top, upper and lower ports in said second wall providing liquid communication between the interiors of said casing and housing, and pipe means connected to said casing for communication with a steam boiler.

2. A water level indicating gauge as in claim 1 further comprising radiation shielding baffles joined to said second wall and extending into said casing and across the openings of said ports.

References Cited in the file of this patent

UNITED STATES PATENTS

| | | |
|---|---|---|
| 2,708,721 | Ziffer | May 17, 1955 |
| 2,877,352 | Weigel et al. | Mar. 10, 1959 |
| 2,884,530 | Foster | Apr. 28, 1959 |
| 2,906,878 | Goodman | Sept. 29, 1959 |

FOREIGN PATENTS

| | | |
|---|---|---|
| 878,115 | Germany | June 1, 1953 |
| 703,712 | Great Britain | Feb. 10, 1954 |